US010632593B2

(12) United States Patent
Zanni

(10) Patent No.: US 10,632,593 B2
(45) Date of Patent: Apr. 28, 2020

(54) DEVICE FOR THE LOCKING OF PIECES ON MACHINE TOOLS

(71) Applicant: HYDROBLOCK S.R.L., Reggio Emilia (IT)

(72) Inventor: Davide Zanni, Reggio Emilia (IT)

(73) Assignee: Hydroblock S.R.L., Reggio Emilia (IT)

(*) Notice: Subject to any disclaimer, the term of this patent is extended or adjusted under 35 U.S.C. 154(b) by 126 days.

(21) Appl. No.: 16/073,751

(22) PCT Filed: Jan. 26, 2017

(86) PCT No.: PCT/IB2017/050415
§ 371 (c)(1),
(2) Date: Jul. 27, 2018

(87) PCT Pub. No.: WO2017/130132
PCT Pub. Date: Aug. 3, 2017

(65) Prior Publication Data
US 2019/0015952 A1  Jan. 17, 2019

(30) Foreign Application Priority Data

Jan. 27, 2016 (IT) .............................. UB2016A0781

(51) Int. Cl.
*B25B 5/06* (2006.01)
*B25B 5/08* (2006.01)
(Continued)

(52) U.S. Cl.
CPC .............. *B25B 5/061* (2013.01); *B23Q 3/068* (2013.01); *B25B 5/087* (2013.01); *B25B 13/5083* (2013.01)

(58) Field of Classification Search
CPC ..... B25B 5/061; B25B 5/087; B25B 13/5083; B23Q 3/068
(Continued)

(56) References Cited

U.S. PATENT DOCUMENTS 1,992,474 A * 2/1935 Currier ............... B25B 13/5083
81/445
3,565,416 A * 2/1971 Williamson ......... B23Q 1/0063
269/47
(Continued)

FOREIGN PATENT DOCUMENTS

DE  102012223868 A1  6/2014
EP     0549385 A1    6/1993
(Continued)

OTHER PUBLICATIONS

International Search Report and Written Opinion dated May 11, 2017 from International Patent Application No. PCT/IB2017/050415, filed Jan. 26, 2017.

*Primary Examiner* — Joseph J Hail
*Assistant Examiner* — J Stephen Taylor
(74) *Attorney, Agent, or Firm* — David B. Tingey; Bryant J. Keller; Kirton McConkie

(57) ABSTRACT

The device (1) for the locking of pieces on machine tools comprises: —a base body (2, 3, 4) fixable to a machine tool (M); —a gripping assembly (5, 6, 7) for gripping a piece (P) to be machined having a cavity (C) with a cavity axis (A1), the gripping assembly (5, 6, 7) comprising: —a main head (5) having a main axis (A3) and associated with the base body (2, 3, 4) with a lateral play adapted to allow the shift of the main head (5) along a plane of alignment (B) substantially orthogonal to the main axis (A3); —at least two self-centering locking elements (6) associated with the main head (5) in a movable way; and —movement means (7) of the self-centering locking elements (6); —removable locking means (18) adapted to temporarily lock the main head (5).

10 Claims, 4 Drawing Sheets

(51) Int. Cl.
*B25B 13/50* (2006.01)
*B23Q 3/06* (2006.01)

(58) Field of Classification Search
USPC ................................. 269/27, 154.2, 54.3
See application file for complete search history.

(56) References Cited

U.S. PATENT DOCUMENTS

| | | | | |
|---|---|---|---|---|
| 4,208,061 A * | 6/1980 | Morawski | ........... | B23B 31/4033 |
| | | | | 242/573 |
| 6,024,354 A * | 2/2000 | Yonezawa | ............ | B23Q 1/0081 |
| | | | | 269/309 |
| 7,303,186 B2 * | 12/2007 | Yonezawa | ............ | B23B 31/402 |
| | | | | 269/309 |
| 9,490,037 B2 * | 11/2016 | Kamiyoshi | ............. | F22B 37/20 |
| 2006/0033255 A1 * | 2/2006 | Yonezawa | ............ | B23Q 1/009 |
| | | | | 269/309 |
| 2013/0249156 A1 * | 9/2013 | Haruna | ................. | B23Q 1/009 |
| | | | | 269/32 |

FOREIGN PATENT DOCUMENTS

| | | | | |
|---|---|---|---|---|
| EP | 0785049 A1 * | 7/1997 | ............ | B25B 5/061 |
| WO | WO-2016135401 A1 * | 9/2016 | ........... | B23Q 1/0081 |

* cited by examiner

DEVICE FOR THE LOCKING OF PIECES ON MACHINE TOOLS

TECHNICAL FIELD

The present invention relates to a device for the locking of pieces on machine tools.

BACKGROUND ART

Suitable fixing systems are usually used for the locking of pieces to be machined on a machine tool.

In this regard it is known that, in order to stably lock a piece, it is sufficient to fix it at three predetermined gripping points which enable the operator to univocally fix the piece zero point with respect to the machine tool zero point.

Depending on the type of machining operation to be performed on the machine tool, however, it sometimes occurs that three gripping points only are not enough to completely stabilize the piece on the machine tool.

This need is particularly felt, for example, in the automotive sector, in which the continuing need to optimize production cycles has led to the use of tools that operate at very high speeds, discharging very strong forces and vibrations on the piece.

Still in the automotive sector, moreover, the use is increasingly more frequent of particularly lightweight materials such as aluminum which, nevertheless, during working on the machine tool, are not able to ensure the same resistance as materials such as cast iron and steel.

It does, therefore, occur that the machining of some portions of the pieces, particularly if they are very distant from the gripping points, can result in the deformation of the pieces themselves by the tool, something which negatively affects the quality of the machining operation with the risk of obtaining out-of-tolerance pieces.

To overcome these drawbacks, the use is known of additional fixing systems which define extra gripping points over and above the three predetermined gripping points.

Such additional fixing systems, which are positioned after positioning the piece on the machine tool and locking it at the three predetermined gripping points, do have a number of drawbacks related to the great difficulty of locking the piece without these deforming it.

The locking of the piece at four or more points, in fact, defines a hyperstatic structure wherein the number of degrees of constraint of the piece is greater than the number of its degrees of freedom.

In such hyperstatic structure the presence of a higher number of constraints can generate states of internal tension whenever the fixing systems are not fitted at the exact points of the piece.

While it is hypothetically possible to place a fixing system with extreme precision in a predetermined position of the machine tool, nevertheless it is virtually impossible to predict at what exact point of the piece the fixing system will come into contact due to the fact that the piece (e.g., obtained by casting or molding) still has rough surfaces to be machined.

The result, therefore, is that the piece is fixed in four or more points to increase its stability during machining but is however subjected to states of internal tension which may determine its deformation during clamping.

DESCRIPTION OF THE INVENTION

The main aim of the present invention is to provide a device for the locking of pieces on machine tools which allows stably locking a piece to be machined on a machine tool without loading it from the point of view of tension and without deforming it.

Another object of the present invention is to provide a device for the locking of pieces on machine tools which allows to overcome the mentioned drawbacks of the prior art within the ambit of a simple, rational, easy, effective to use and affordable solution.

The above mentioned objects are achieved by the present device for the locking of pieces on machine tools having the characteristics of claim 1.

BRIEF DESCRIPTION OF THE DRAWINGS

Other characteristics and advantages of the present invention will become better evident from the description of a preferred, but not exclusive, embodiment of a device for the locking of pieces on machine tools, illustrated by way of an indicative but non-limiting example in the accompanying drawings, wherein.

EMBODIMENTS OF THE INVENTION

Figure 1:
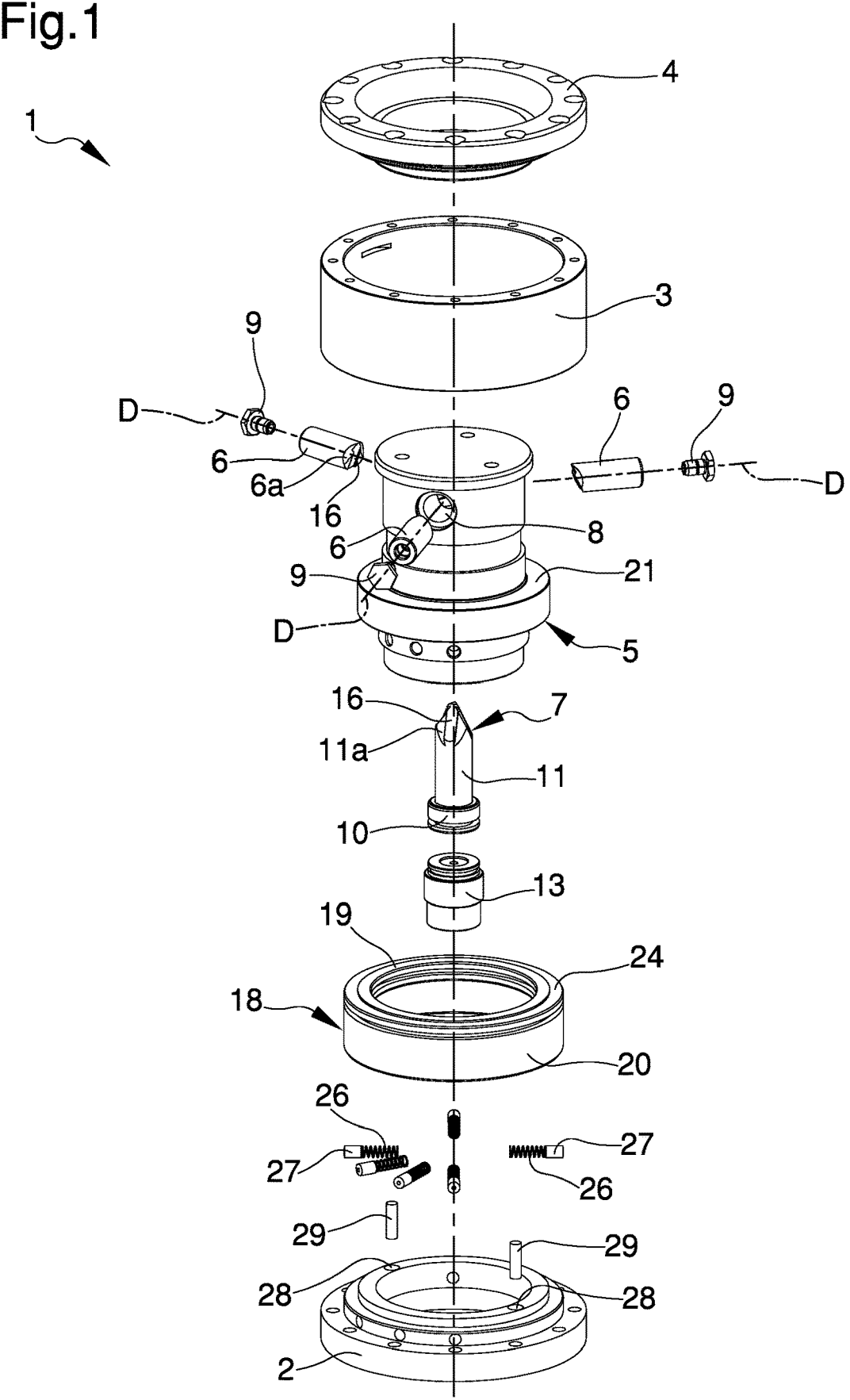
FIG. 1 is an exploded view of the device according to the invention.
Figure 2:
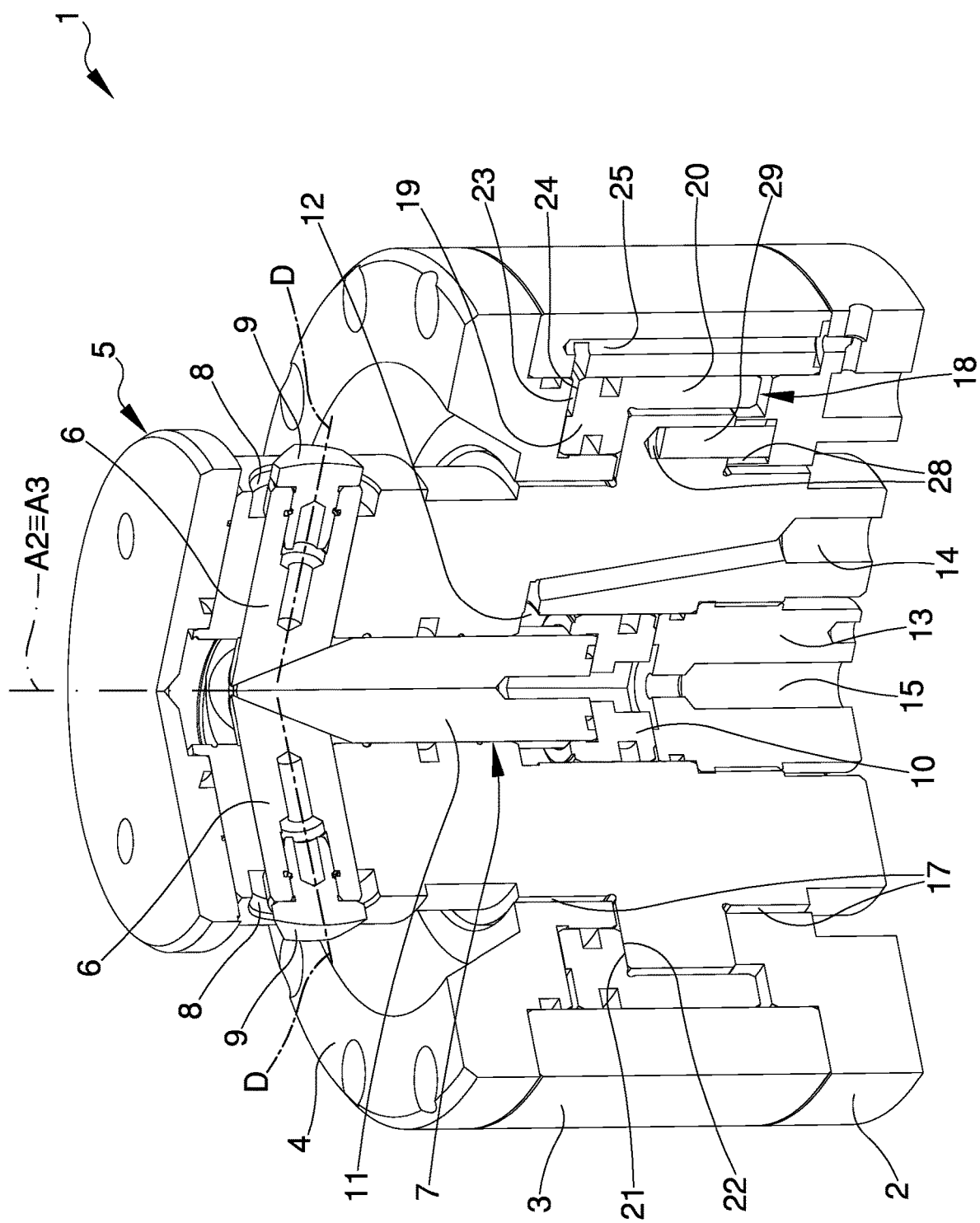
FIG. 2 is an axonometric, partially broken-away view of the device according to the invention.
Figure 3:
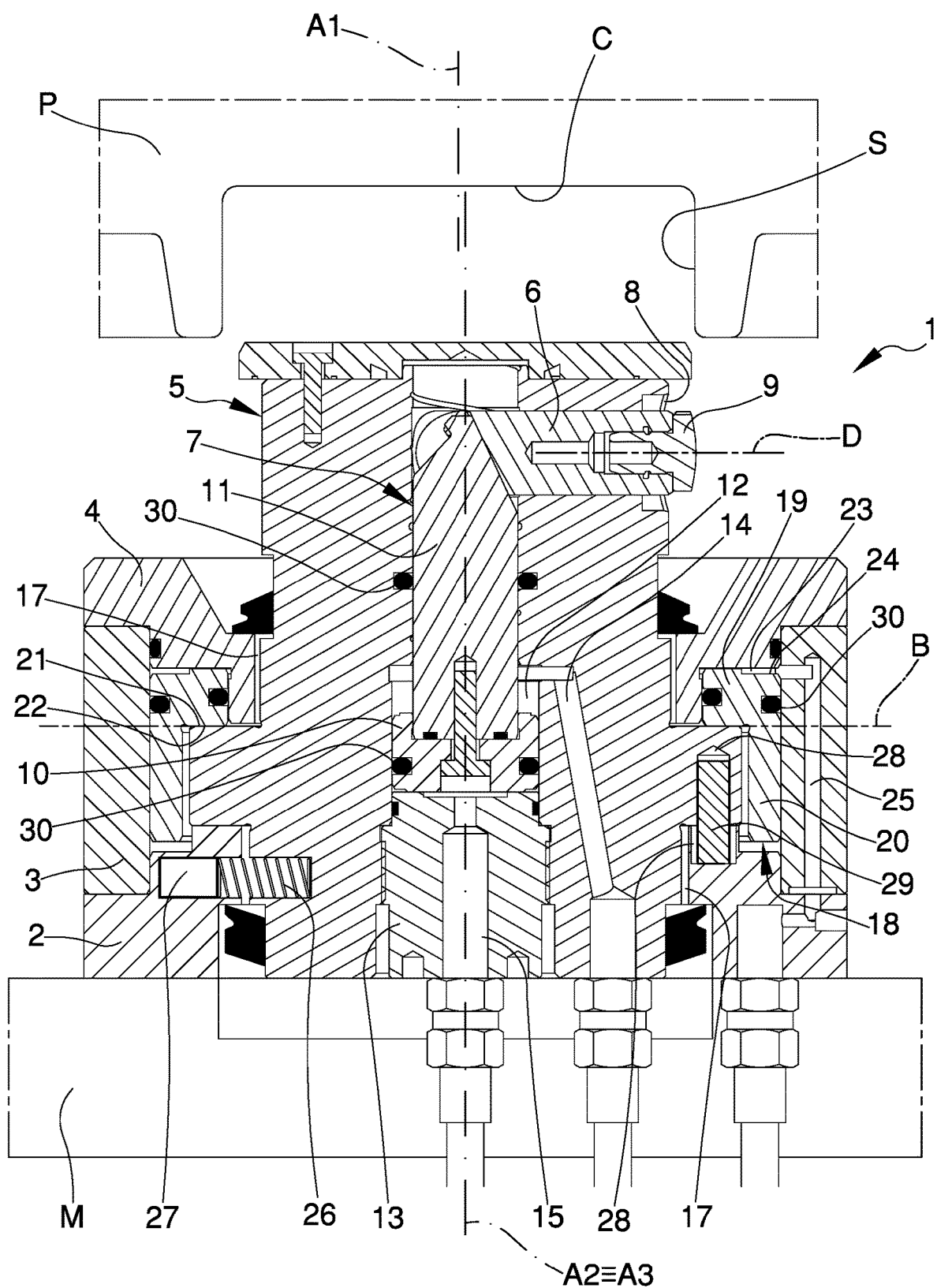
FIG. 3 is a sectional view of the device according to the invention during the step of insertion into a cavity of a piece to be machined.
Figure 4:
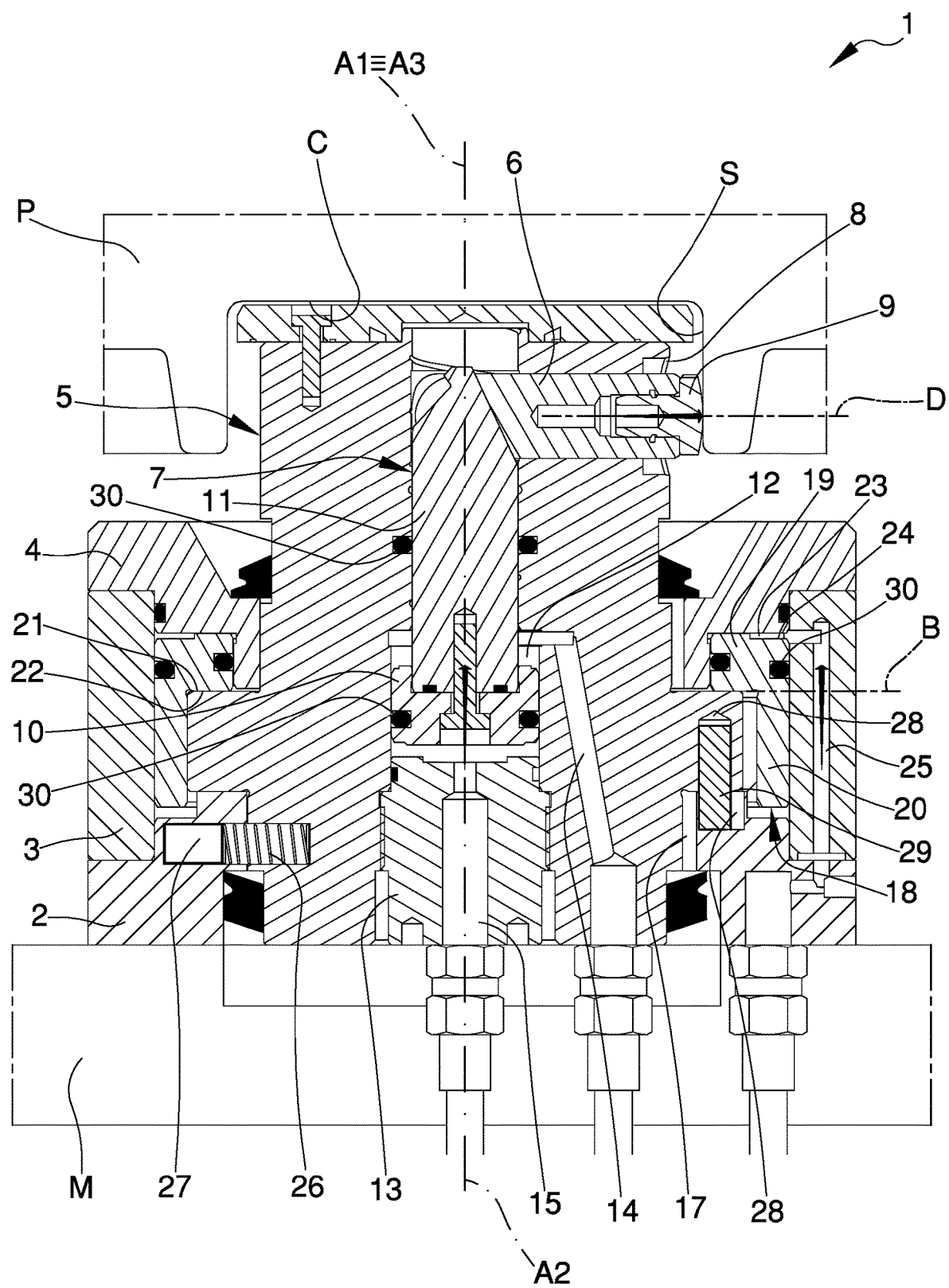
FIG. 4 is a sectional view of the device according to the invention in an alignment configuration.

With particular reference to such illustrations, globally indicated with reference numeral 1 is a device for the locking of pieces on machine tools.

The device 1 is intended to lock a piece P to be machined on a machine tool M and, in particular, acts as an additional lock after the piece P has already been fixed in three gripping points, not shown in the illustrations, on the machine tool M.

The piece P to be machined on the machine tool M has at least one cavity C which has a cavity axis A1 and which, e.g., consists of a groove, a through hole or other seat.

The cavity C has a substantially axial-symmetric shape, e.g., cylindrical or truncated cone (as in the case of cylindrical seats with 3° draft angle), and the cavity axis A1 coincides with the geometrical axis of the cavity C.

In this regard it must be underlined that the cavity axis A1 does not coincide with the final axis which the piece will have at the end of the mechanical machining operations but, rather, with a reference direction defined by geometry, mostly rough, of the cavity C when the piece P is mounted on the machine tool M.

It is expected, in fact, that the piece P, before reaching the machine tool M, has been obtained by casting, molding or similar methods and, therefore, has irregular surfaces and contours.

The device 1 comprises:
- at least one base body 2, 3, 4 fixable to a machine tool M, e.g., to its worktop, to its bedplate or to any other part of same; and
- at least one gripping assembly 5, 6, 7 for gripping the piece P to be machined on the machine tool M.

The base body 2, 3, 4 has a central axis A2 and comprises a hollow lateral liner. The hollow lateral liner 2, 3, 4 is defined, e.g., by a bottom 2 of annular shape, by a cylindrical wall 3 associated with the bottom 2, and by a top 4, also of annular shape and associated with the cylindrical wall 3 on the opposite side of the bottom 2.

The hollow lateral liner 2, 3, 4 is axial-symmetric and, in the particular embodiment shown in the illustrations, the central axis A2 coincides with the axis of symmetry of the hollow lateral liner 2, 3, 4.

Alternative embodiments cannot however be ruled out wherein the base body 2, 3, 4 is shaped differently and its central axis A2 does not coincide with an axis of symmetry of same.

The gripping assembly 5, 6, 7 comprises:
- a main head 5 which has a main axis A3 and is insertable into the cavity C in an insertion configuration wherein the main axis A3 is substantially parallel to the cavity axis A1;
- at least two self-centering locking elements 6 associated with the main head 5 in a movable way along sliding directions D substantially transverse to the main axis A3 to abut on the inner surface S of the cavity C when the main head 5 is in the insertion configuration; and
- movement means 7 of the self-centering locking elements 6 between a retraction position, wherein the self-centering locking elements 6 are substantially retracted inside the main head 5, and an extraction position, wherein the self-centering locking elements 6 protrude from the main head 5 and abut on the inner surface S of the cavity C.

The main head 5 is axial-symmetric and, in the particular embodiment shown in the illustrations, the main axis A3 coincides with the axis of symmetry of the main head 5.

Alternative embodiments cannot however be ruled out wherein the main head 5 is otherwise shaped and its main axis A3 does not coincide with an axis of symmetry of the same.

The self-centering locking elements 6 consist, e.g., in a series of elongated pins which extend along the respective sliding directions D and are inserted sliding inside corresponding openings 8 obtained in the main head 5.

In the particular embodiment shown in the illustrations, there are three self-centering locking elements 6 and these lie, staggered by 120° the one from the other, on a same plane orthogonal to the main axis A3; different embodiments cannot however be ruled out having a different number of self-centering locking elements 6.

At each distal extremity of the self-centering locking elements 6 a corresponding releasable tip 9 is mounted; by replacing the releasable tips 9 with others of different size and conformation it is possible to lock pieces P having different cavities C.

The movement means 7 for the operation of the self-centering locking elements 6 are of the hydraulic type and comprise:
- at least one operating piston 10, housed inside the main head 5 and movable along the main axis A3 by means of the thrust of a hydraulic fluid under pressure; and
- at least one operating pin 11, which is positioned between the operating piston 10 and the self-centering locking elements 6 and is adapted to convert the motion of the operating piston 10 along the main axis A3 into the motion of the self-centering locking elements 6 along the sliding directions D.

In this regard, the fact is underlined that inside the main head 5 is obtained an operating chamber 12, which is closable by means of a plug 13 and wherein the operating piston 10 runs.

The opposite extremities of the operating chamber 12 are placed in fluidic communication with respective access ducts 14, 15 of the hydraulic fluid, which permit hydraulically supplying the operating chamber 12 both in one direction and the other to allow the operating piston 10 running in both directions (double-acting operation).

An access duct 14 is obtained through the main head 5 while the other access duct 15 is obtained through the plug 13.

The operating pin 11 has an extremity, associated with the operating piston 10, and an opposite extremity 11a, wedge-shaped to wedge on corresponding surfaces 6a of the self-centering locking elements 6 which allow transferring the motion from the main axis A3 to the sliding directions D.

On the opposite extremity 11a and on the corresponding surfaces 6a dovetail guides 16 are obtained which allow pushing the self-centering locking elements 6 both in one direction of the sliding directions D, and in the opposite direction.

The main head 5 is associated with the base body 2, 3, 4 with a lateral play adapted to allow the shift of the main head 5 along a plane of alignment B substantially orthogonal to the main axis A3 to allow the placement of the gripping assembly 5, 6, 7 in an alignment configuration wherein the main axis A3 is aligned with the cavity axis A1.

More in detail, the main head 5 is at least partly housed inside the hollow lateral liner 2, 3, 4, between the hollow lateral liner 2, 3, 4 and the main head 5 being delimited at least an interspace 17 defining the aforementioned lateral play.

The thickness of the interspace 17, e.g., is on average equal to 1 mm, so as to leave the main head 5 free to move on the plane of alignment B by a diameter of 2 mm with respect to a theoretical position of alignment wherein the main axis A3 is aligned with the central axis A2.

Alternative embodiments cannot however be ruled out wherein the thickness of the interspace 17 is different to 1 mm, to allow for greater or lesser freedom of movement to the main head 5.

The device 1 comprises removable locking means 18 adapted to temporarily lock the main head 5 with respect to the base body 2, 3, 4 in the alignment configuration.

The removable locking means 18 are of the hydraulic type and comprise at least one stop body 19, 20 positioned between the base body 2, 3, 4 and the main head 5 and operable by a hydraulic fluid under pressure to press and stop the main head 5 in the alignment configuration.

In this regard it is underlined that the main head 5 comprises at least a first flat surface 21 substantially parallel to the plane of alignment and the stop body 19, 20 comprises at least a second flat surface 22 substantially parallel to the plane of alignment B and substantially placed in contact with the first flat surface 21. The drainage of the hydraulic fluid is adapted to allow the sliding of the first flat surface 21 on the second flat surface 22 and the shift of the main head 5 along the plane of alignment B, while the pressurizing of the hydraulic fluid determines the thrust of the second flat surface 22 on the first flat surface 21 and the locking by friction of the main head 5.

The removable locking means 18, in fact, comprise at least one inlet chamber 23 of the hydraulic fluid which is delimited by the base body 2, 3, 4 and by an active surface 24 of the stop body 19, 20 which is arranged on the substantially opposite side with respect to the second flat surface 22.

The inlet chamber 23 is placed in fluidic communication with at least an inlet duct 25 obtained in the base body 2, 3, 4.

During the step of positioning the piece P on the machine tool M, the inlet duct 25 and the inlet chamber 23 are not supplied with the hydraulic fluid under pressure and the stop body 19, 20 remains resting on the main head 5 leaving the latter free to move along the plane of alignment B.

Once the gripping assembly 5, 6, 7 has been placed in the alignment configuration, on the other hand, the inlet duct 25 and the inlet chamber 23 are supplied with the hydraulic fluid under pressure; on the active surface 24 of the stop body 19, 20, therefore, a force is applied which pushes the stop body 19, 20 along the central axis A2 towards the main head 5 and between the first flat surface 21 and the second flat surface 22 a friction force is established which keeps the gripping assembly 5, 6, 7 locked.

Usefully, the stop body 19, 20 is substantially cup-shaped and comprises:
- a bottom portion 19 of substantially annular shape having the second flat surface 22; and
- a lateral portion 20 of substantially cylindrical shape which extends from the bottom portion 19 along an axis substantially parallel to the main axis.

The lateral portion 20 is fitted substantially to measure inside the base body 2, 3, 4 and at least partly surrounds the main head 5.

Both the movement means 7 and the removable locking means 18, as has been said, are of the hydraulic type; between the various parts of the device 1 which come into contact with the hydraulic fluid suitable gaskets 30 are therefore provided.

Between the base body 2, 3, 4 and the main head 5 return means 26, 27 are positioned which are adapted to bring the main head 5 again to the theoretical position of alignment wherein the main axis A3 is aligned with the central axis A2.

The return means 26, 27 comprise a plurality of springs 26 distributed around the main head 5 and acting along directions substantially transverse to the central axis A2.

If needed, the return means 26, 27 are adjustable so as to cancel the weight of the gripping assembly 5, 6, 7.

It is noticed, in fact, that when the device 1 is mounted on the machine tool M with the central axis A2 and the main axis A3 arranged non-vertical (that is, horizontal or oblique), then the component of the weight of the gripping assembly 5, 6, 7 is unloaded on the return means 26, 27.

The return means 26, 27, therefore, comprise adjusting elements 27 adapted to preload the springs 26.

The adjusting elements 27, e.g., consist of a series of spacers insertable between the base body 2, 3, 4 and the springs 26; having spacers 27 of different length, it is easy to understand how it is possible to preload the springs 26 with a different preload according to the circumstances so that, in the absence of external thrusts, the main head 5 is positioned in the theoretical position of alignment even when the central axis A2 and the main axis A3 are not vertical.

Between the base body 2, 3, 4 and the main head 5, furthermore, anti-rotation means 28, 29 are positioned adapted to prevent the complete rotation of the main head 5 around the main axis A3.

The anti-rotation means 28, 29 comprise at least one pair of seats for pegs 28 formed on the base body 2, 3, 4 and on the main head 5, and at least one peg element 29 partially inserted in the seats for pegs 28.

Usefully, the peg element 29 extends along a direction substantially parallel to the main axis A3 and is coupled to at least one of the seats for pegs 28 with a play at least equal to the lateral play defined by the interspace 17.

This way the peg element 29 does not restrict the freedom of movement of the main head 5 along the plane of alignment B.

Advantageously, the peg elements 29 and the respective pairs of seats for pegs 28 may be more than one; in the particular embodiment shown in the illustrations, for example, there are two peg elements 29 and two pairs of seats for pegs 28.

It has in practice been found that the described invention achieves the intended objects.

In this regard it is stressed that the particular solution of providing for a lateral play between the main head and the base body and the presence of the removable locking means, which allow locking the main head in the alignment configuration, are such that the device according to the invention can be used to stably lock a piece to be machined on a machine tool without deforming it in any way.

The invention claimed is:

1. A device for the locking of pieces on machine tools, comprising:
   at least one base body fixable to a machine tool; and
   at least one gripping assembly for gripping a piece to be machined having at least one cavity with a cavity axis, said gripping assembly being adapted to lock said piece on said machine tool and comprising:
      a main head having a main axis and insertable into said cavity in an insertion configuration wherein said main axis is substantially parallel to said cavity axis;
      at least two self-centering locking elements associated with said main head in a movable way along sliding directions substantially transverse to said main axis to abut on the inner surface of said cavity when said main head is in said insertion configuration; and
      movement means of said self-centering locking elements between a retraction position and an extraction position;
   wherein said main head is associated with said base body with a lateral play adapted to allow the shift of said main head along a plane of alignment substantially orthogonal to said main axis to allow the placement of said gripping assembly in an alignment configuration wherein said main axis is aligned with said cavity axis; and
   wherein said device comprises removable locking means adapted to temporarily lock said main head with respect to said base body in said alignment configuration.

2. The device according to claim 1, wherein said base body comprises a hollow lateral liner inside which said main head is at least partly housed, between said hollow lateral liner and said main head being delimited at least an interspace defining said lateral play.

3. The device according to claim 1, wherein said movement means are of the hydraulic type and comprise:
   at least one operating piston, housed inside said main head and movable along said main axis by means of the thrust of a hydraulic fluid under pressure; and
   at least one operating pin, which is positioned between said operating piston and said self-centering locking elements and is adapted to convert the motion of said operating piston along said main axis into the motion of said self-centering locking elements along said sliding directions.

4. The device according to claim 1, wherein said removable locking means are of the hydraulic type and comprise at least one stop body positioned between said base body and said main head and operable by a hydraulic fluid under pressure to press and stop said main head in said alignment configuration.

5. The device according to claim 4, wherein said main head comprises at least a first flat surface substantially parallel to said plane of alignment and said stop body comprises at least a second flat surface substantially parallel to said plane of alignment and substantially placed in contact with said first flat surface, the drainage of said hydraulic fluid being adapted to allow the sliding of said first flat surface on said second flat surface and the shift of said main head along said plane of alignment, while the pressurizing of said hydraulic fluid determining the thrust of said second flat surface on said first flat surface and the locking by friction of said main head.

6. The device according to claim 5, wherein said removable locking means comprise at least one inlet chamber of said hydraulic fluid delimited by said base body and by an active surface of said stop body which is arranged on the substantially opposite side with respect to said second flat surface.

7. The device according to claim 5, wherein said stop body is substantially cup-shaped and comprises:
   a substantially annular bottom portion having said second flat surface; and
   a substantially cylindrical lateral portion which extends from said bottom portion along an axis substantially parallel to said main axis.

8. The device according to claim 1, wherein said base body comprises a central axis and between said base body and said main head return means are positioned which are adapted to bring said main head again to a theoretical position of alignment wherein said main axis is aligned with said central axis.

9. The device according to claim 8, wherein said return means comprise a plurality of springs distributed around said main head and acting along directions substantially transverse to said central axis.

10. The device according to claim 1, wherein between said base body and said main head anti-rotation means are positioned adapted to prevent the complete rotation of said main head around said main axis.

* * * * *